US010254683B2

(12) United States Patent
Imanaka et al.

(10) Patent No.: US 10,254,683 B2
(45) Date of Patent: Apr. 9, 2019

(54) IMAGE FORMING APPARATUS FOR CLEANING INTERMEDIATE TRANSFER BELT

(71) Applicant: KYOCERA Document Solutions Inc., Osaka-shi, Osaka (JP)

(72) Inventors: Koichi Imanaka, Osaka (JP); Takashi Kusukawa, Osaka (JP)

(73) Assignee: KYOCERA Document Solutions Inc., Osaka-shi, Osaka (JP)

(*) Notice: Subject to any disclaimer, the term of this patent is extended or adjusted under 35 U.S.C. 154(b) by 0 days.

(21) Appl. No.: 15/877,708

(22) Filed: Jan. 23, 2018

(65) Prior Publication Data

US 2018/0217526 A1 Aug. 2, 2018

(30) Foreign Application Priority Data

Jan. 31, 2017 (JP) .................. 2017-015573

(51) Int. Cl.
| G03G 15/16 | (2006.01) |
| H04N 1/00 | (2006.01) |
| G03G 21/10 | (2006.01) |
| G03G 21/12 | (2006.01) |

(52) U.S. Cl.
CPC .......... G03G 15/161 (2013.01); G03G 21/10 (2013.01); G03G 21/105 (2013.01); G03G 21/12 (2013.01); H04N 1/00909 (2013.01); G03G 2215/1661 (2013.01); H04N 2201/0094 (2013.01)

(58) Field of Classification Search
CPC .... G03G 15/161; G03G 15/168; G03G 21/10; G03G 21/105; G03G 21/12; G03G 2215/1661; H04N 1/0909; H04N 2201/0094
See application file for complete search history.

(56) References Cited

U.S. PATENT DOCUMENTS

2014/0153957 A1* 6/2014 Yonemoto ............ G03G 15/161
399/101

FOREIGN PATENT DOCUMENTS

JP 2016062064 A 4/2016

* cited by examiner

*Primary Examiner* — Hoang X Ngo
(74) *Attorney, Agent, or Firm* — Alleman Hall Creasman & Tuttle LLP

(57) ABSTRACT

An image forming apparatus includes an image carrier, a removal roller, a collection roller, a housing, a screw, and a seal. The removal roller rotates while in contact with the intermediate transfer belt and removes residual toner from the intermediate transfer belt. The collection roller rotates while in contact with the removal roller so as to collect, from the removal roller by electrostatic force, waste toner that is the residual toner removed by the removal roller. The housing has an upper opening for receiving the waste toner collected by the collection roller and stores the waste toner. The screw conveys the waste toner stored in the housing. The seal comes into contact with the collection roller and closes a gap between the collection roller and the housing at the upper opening.

9 Claims, 2 Drawing Sheets

IMAGE FORMING APPARATUS FOR CLEANING INTERMEDIATE TRANSFER BELT

INCORPORATION BY REFERENCE

This application is based upon and claims the benefit of priority from the corresponding Japanese Patent Application No. 2017-015573 filed on Jan. 31, 2017, the entire contents of which are incorporated herein by reference.

BACKGROUND

The present disclosure relates to an image forming apparatus configured to clean an intermediate transfer belt.

In an image forming apparatus for forming an image by an electrophotographic system, a cleaning device removes residual toner from a surface of an intermediate transfer belt after a toner image is transferred therefrom to a sheet. In the cleaning device, toner is removed from the intermediate transfer belt by a removal roller such as a rotating brush, and collected on a collection roller by electrostatic force. The toner collected on the collection roller is scraped off by a blade, and stored in a storage space defined by a housing. The toner in the storage space is conveyed by a screw provided in the housing, and stored in a waster toner box or the like.

Meanwhile, the housing may be disposed at a side of the removal roller. In that case, a seal is arranged to stand upright facing the removal roller so as to prevent toner from backflowing from the housing to the removal roller.

SUMMARY

An image forming apparatus according to an aspect of the present disclosure includes an image carrier, a removal roller, a collection roller, a housing, a screw, and a seal. The image carrier carries a toner image. The toner image is transferred from the image carrier to the intermediate transfer belt. The removal roller rotates while in contact with the intermediate transfer belt and removes residual toner from the intermediate transfer belt. The collection roller rotates while in contact with the removal roller so as to collect, from the removal roller by electrostatic force, waste toner that is the residual toner removed by the removal roller. The housing has an upper opening for receiving the waste toner collected by the collection roller and stores the waste toner. The screw conveys the waste toner stored in the housing. The seal comes into contact with the collection roller and closes a gap between the collection roller and the housing at the upper opening.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclusure with reference to the accompanying drawings.

Figure 1:
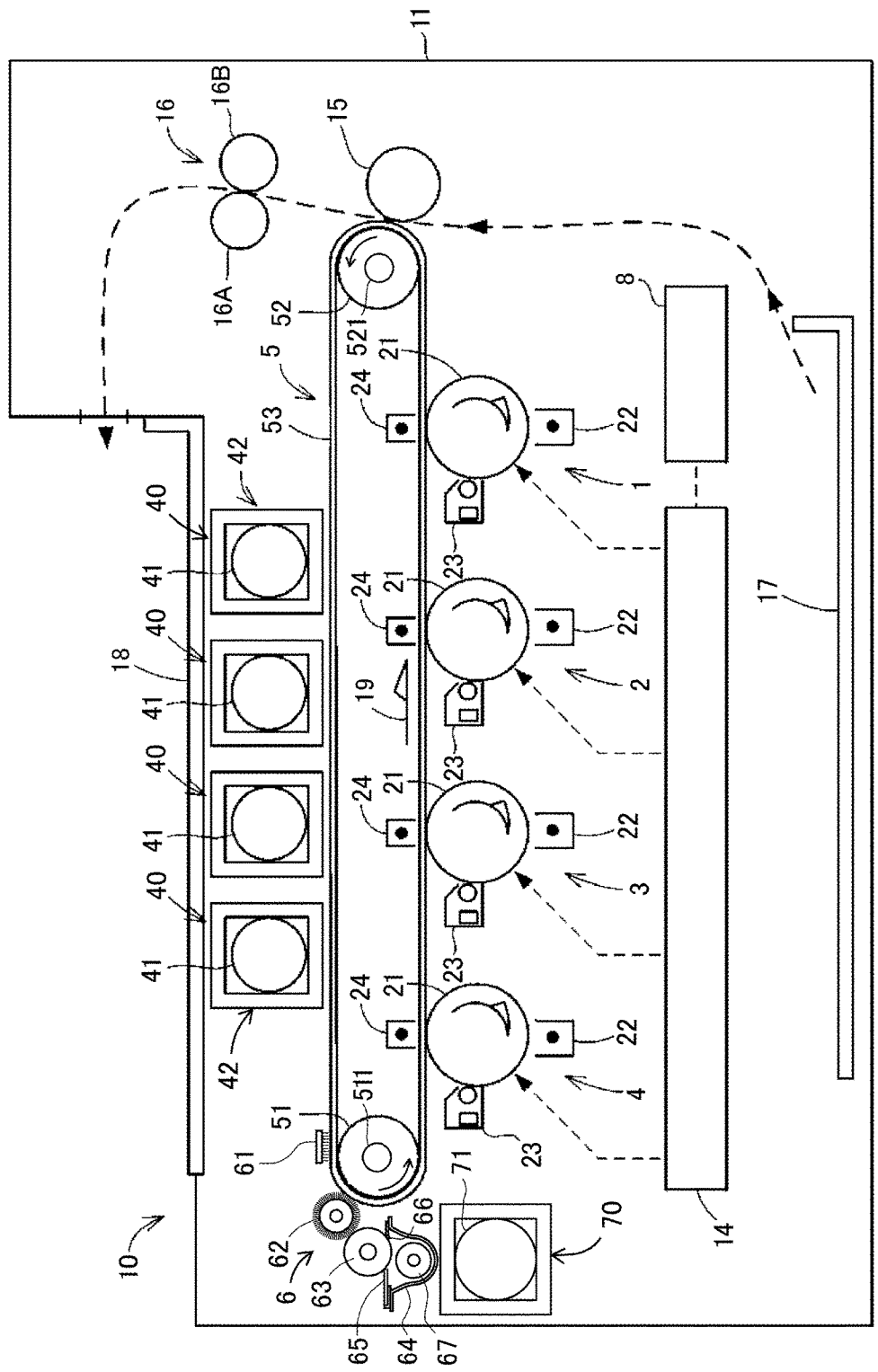
FIG. 1 is a cross-sectional diagram schematically showing an image forming apparatus according to an embodiment of the present disclosure.

An image forming apparatus 10 shown in FIG. 1 has at least a print function, and is, for example, a color printer. The image forming apparatus 10 prints an image on a sheet of print paper by using developer that includes toner. It is noted that a specific example of the image forming apparatus 10 according to an embodiment of the present disclosure is a printer, a copier, a facsimile or a multifunction peripheral having the functions of these. In addition, although the image forming apparatus 10 is configured to form a color image, the image forming apparatus of the present disclosure may be configured to form a monochrome image.

The image forming apparatus 10 is a so-called tandem-type color image forming apparatus. The image forming apparatus 10 includes a plurality of image forming portions 1 to 4, an intermediate transfer unit 5, an exposure device 14, a secondary transfer device 15, a fixing device 16, a belt cleaning device 6, a toner replenishment device 40, a sheet feed tray 17, and a sheet discharge tray 18. These components are attached to a housing 11 that constitutes an external frame (not shown), an internal frame and the like of the image forming apparatus 10.

The image forming portions 1 to 4 form, by an electrophotographic system, toner images of different colors respectively on a plurality of photoconductor drums 21 that are arranged in alignment. The toner images are transferred to an intermediate transfer belt 53 while it is running such that the toner images are overlaid with each other thereon. In the example shown in FIG. 1, an image forming portion 1 for black, an image forming portion 2 for yellow, an image forming portion 3 for cyan, and an image forming portion 4 for magenta are arranged in alignment in the stated order from the downstream in a moving direction 19 in which the intermediate transfer belt 53 moves facing the image forming portions 1 to 4.

Each of the image forming portions 1 to 4 includes a photoconductor drum 21 (an example of the image carrier of the present disclosure) carrying a toner image thereon, a charging device 22, a developing device 23, and a primary transfer device 24. The surface of the photoconductor drum 21 is charged by the charging device 22, and the charged surface of the photoconductor drum 21 is exposed by the exposure device 14. This allows an electrostatic latent image to be formed on the surface of the photoconductor drum 21. The developing device 23 develops the electrostatic latent image with the toner. Subsequently, the toner image on the photoconductor drum 21 is transferred to the intermediate transfer belt 53 by the primary transfer device 24.

The intermediate transfer unit 5 includes a driving roller 51 (an example of the support roller of the present disclosure), a driven roller 52, and the intermediate transfer belt 53. The driving roller 51 and the driven roller 52 respectively include rotation shafts 511 and 521 and are configured to rotate counterclockwise in FIG. 1. The positions of the driving roller 51 and the driven roller 52 may be replaced with each other. In that case, the driven roller 52 becomes an example of the support roller of the present disclosure. To the intermediate transfer belt 53, toner images carried by the photoconductor drums 21 are transferred, and a color toner image is formed therefrom. The color toner image is formed from toner images of a plurality of (in the present embodiment, four) colors. The intermediate transfer belt 53 is supported by the driving roller 51 and the driven roller 52 so as to be rotatably driven by them. This makes it possible for the intermediate transfer belt 53 to rotate while its surface is in contact with surfaces of the photoconductor drums 21. When the intermediate transfer belt 53 is rotationally driven, its surface passes through between the photoconductor drums 21 and the primary transfer devices 24. During that movement, the toner images of the different colors carried on the plurality of photoconductor drum 21 are transferred in sequence to the intermediate transfer belt 53 in such a way as to be overlaid with each other thereon.

The toner replenishment device 40 is provided above the intermediate transfer unit 5. In the present embodiment, four toner replenishment devices 40 are provided in correspondence with colors of black, yellow, cyan, and magenta. The toner replenishment devices 40 have the same configuration.

Each of the toner replenishment devices 40 includes a replenishment toner bottle 41 and a container attachment portion 42, wherein the replenishment toner bottle 41 is configured to replenish toner to the developing device 23, and the replenishment toner bottle 41 is attached to the container attachment portion 42. The container attachment portion 42 supports the replenishment toner bottle 41 so as to cover the whole outer circumference of the replenishment toner bottle 41.

The secondary transfer device 15 transfers the color toner image transferred to the intermediate transfer belt 53, to a print sheet conveyed from the sheet feed tray 17. The print sheet with the toner image transferred thereto is conveyed to the fixing device 16 by a conveyance portion (not shown). The fixing device 16 includes a heating roller 16A and a pressure roller 16B. The fixing device 16 conveys the print sheet on which the toner image has been transferred, while applying heat and pressure thereto. This allows the toner image to be fused and fixed to the print sheet. The print sheet to which the toner image has been fixed is further conveyed to the downstream side, and discharged to and held by the sheet discharge tray 18 that is disposed above the intermediate transfer unit 5.

Figure 2:
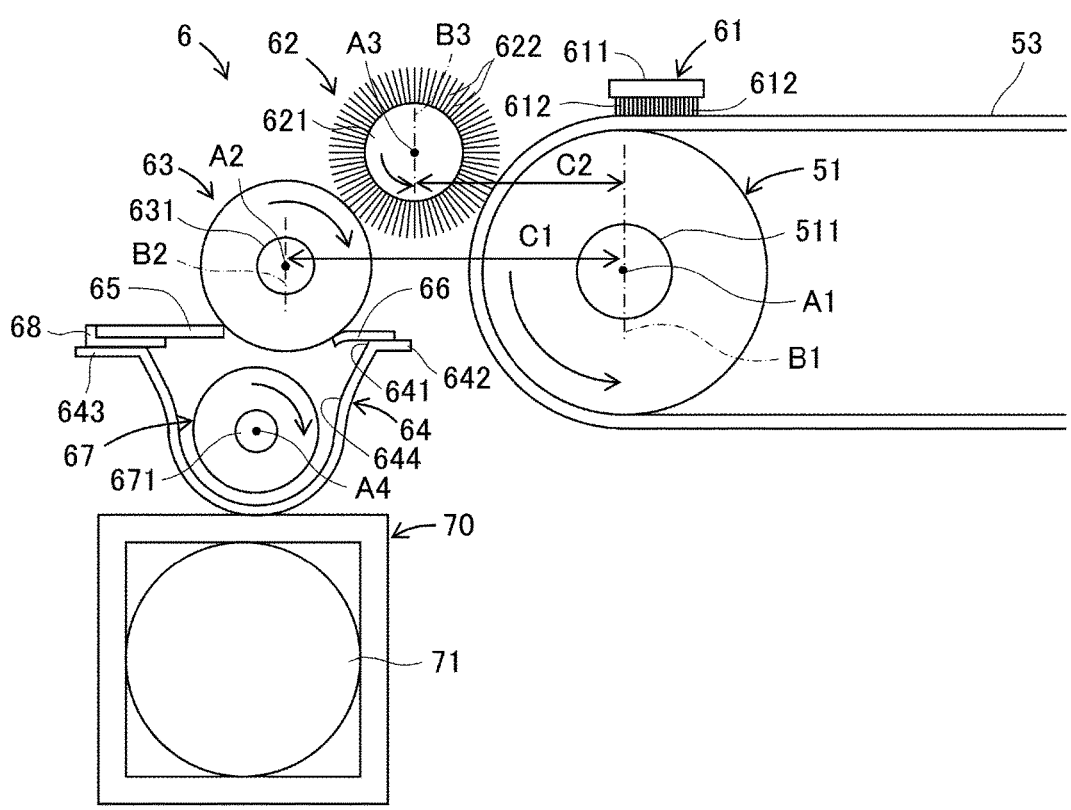
FIG. 2 is a cross-sectional diagram schematically showing a configuration of a cleaning device and its periphery of the image forming apparatus shown in FIG. 1.

As shown in FIG. 2, the belt cleaning device 6 removes and collects toner that has remained on the surface of the intermediate transfer belt 53, and supplies the collected toner to an inside of a waste toner bottle 71 that is described below. Hereinafter, the toner removed from the intermediate transfer belt 53 is referred to as "waste toner". The belt cleaning device 6 is disposed in front of the intermediate transfer unit 5. The belt cleaning device 6 includes a bar brush 61 (an example of the pre-brush of the present disclosure), a fur brush roller 62 (an example of the removal roller of the present disclosure), a metal roller 63 (an example of the collection roller of the present disclosure), a housing 64, a blade 65, a seal 66, and a screw 67.

The bar brush 61 preliminarily charges the toner that has remained on the intermediate transfer belt 53. The bar brush 61 is disposed above the driving roller 51 so as to face the driving roller 51 across the intermediate transfer belt 53. The bar brush 61 is formed by fixing a plurality of brush bristles 612 to a base portion 611. The plurality of brush bristles 612 are in contact with the intermediate transfer belt 53. In the present embodiment, when the intermediate transfer belt 53 is rotated, the bar brush 61 preliminarily charges toner by the friction between the toner and the brush bristles 612.

The base portion 611 is plate-like and is formed from, for example, synthetic resin having insulation property. The plurality of brush bristles 612 are formed from, for example, insulating threads made of synthetic resin. In addition, in the charging series, the brush bristles 612 are preferably positioned more on the side of a polarity opposite to the charging polarity of the toner than the toner. For example, in a case where the charging polarity of the toner is plus, the brush bristles 612 are preferably positioned more on the side of minus in the charging series than the toner. The brush bristles 612 as such are preferably formed from polyester-based resin or acrylic resin.

It is noted that the pre-brush of the present disclosure may be a brush roller such as a fur brush roller. In addition, the pre-brush of the present disclosure may apply a bias voltage so as to preliminarily charge toner that has remained on the intermediate transfer belt 53.

The fur brush roller 62 rotates while in contact with the intermediate transfer belt 53, thereby removing toner that has remained on the intermediate transfer belt 53. The fur brush roller 62 is formed by fixing a plurality of brush bristles 622 that come into contact with the intermediate transfer belt 53, to a metal shaft 621 (an example of the rotation shaft of the removal roller of the present disclosure). The brush bristles 622 are formed from, for example, conductive resin such as conductive polyester or conductive nylon. In addition, the brush bristles 622 may be formed from insulating resin.

The fur brush roller 62 is arranged to be in contact with the intermediate transfer belt 53 at a side of the driving roller 51 in a state where the fur brush roller 62 faces the driving roller 51 via the intermediate transfer belt 53. When a rotational driving force is input to the metal shaft 621, the fur brush roller 62 rotates in the same direction (counterclockwise in FIG. 2) as the intermediate transfer belt 53. That is, the fur brush roller 62 is rotationally driven in a counter direction to the intermediate transfer belt 53. This allows the residual toner to be scraped off from the intermediate transfer belt 53 effectively. In addition, the fur brush roller 62 is preferably higher in peripheral speed than the intermediate transfer belt 53. In that case, the distribution density of waste toner removed from the intermediate transfer belt 53 becomes smaller than the distribution density of residual toner on the intermediate transfer belt 53.

The metal roller 63 rotates while in contact with the fur brush roller 62 so as to collect by electrostatic force, from the fur brush roller 62, the waste toner that has been removed from the intermediate transfer belt 53 by the fur brush roller 62. The metal roller 63 includes a rotation shaft 631, and at least the surface of the metal roller 63 is formed from a metal. For example, the whole of the metal roller 63 may be formed from stainless steel. A bias voltage of an opposite polarity to the charging polarity of the toner is applied to the metal roller 63 from a voltage applying portion (not shown). This causes a potential difference to be made between the metal roller 63 and the fur brush roller 62, and the waste toner is collected by the metal roller 63 from the fur brush roller 62. In addition, when a rotational driving force is input to the rotation shaft 631, the metal roller 63 is rotated in a direction (clockwise in FIG. 2) opposite to the rotation direction of the fur brush roller 62. In addition, the metal roller 63 is preferably higher in peripheral speed than the fur brush roller 62. In that case, the distribution density of waste toner removed from the fur brush roller 62 becomes smaller than the distribution density of waste toner on the fur brush roller 62.

The metal roller 63 is disposed such that a shaft center A2 of the rotation shaft 631 is higher in position than an upper opening 641 of the housing 64 that is described below, and the lowest point of the metal roller 63 is lower than the upper opening 641 of the housing 64. That is, a part of the metal roller 63 that is positioned lower than the shaft center A2 of the rotation shaft 631 has a part that is positioned lower than the upper opening 641 of the housing 64. In addition, in the metal roller 63, the shaft center A2 of the rotation shaft 631 is positioned lower than a shaft center A3 of the metal shaft 621 of the fur brush roller 62. That is, the metal roller 63 is positioned relatively lower than the fur brush roller 62. In addition, a distance C1 between a first vertical line B1 and a second vertical line B2 is larger than a distance C2 between the first vertical line B1 and a third vertical line B3, wherein the first vertical line B1 passes through a shaft center A1 of a rotation shaft 511 of the driving roller 51, the second vertical line B2 passes through the shaft center A2 of the rotation shaft 631 of the metal roller 63, and the third vertical line B3 passes through the shaft center A3 of the metal shaft 621 of the fur brush roller 62. That is, the metal roller 63 is positioned relatively farther from the driving roller 51 than the fur brush roller 62. With the configuration where the metal roller 63 is positioned relatively lower than the fur brush roller 62 and relatively farther from the driving roller 51 than the fur brush roller 62, in the path in which the waste toner removed from the intermediate transfer belt 53 is conveyed, a part of the path in which the waste toner is moved against the gravity is reduced. That is, the part of the waste toner conveyance path in which the waste toner is moved against the gravity is a part where the waste toner is conveyed by the fur brush roller 62, and a part where the waste toner is conveyed by the metal roller 63 does not include a part where the waste toner is moved against the gravity. Accordingly, the above-described configuration makes it possible to suppress scattering of waste toner from the metal roller 63. On the other hand, in the fur brush roller 62, the waste toner is held among the brush bristles 622. Accordingly, scattering of waste toner can be suppressed even when the waste toner is moved against the gravity. Furthermore, in a case where the fur brush roller 62 is higher in peripheral speed than the intermediate transfer belt 53, and the metal roller 63 is higher in peripheral speed than the fur brush roller 62, the distribution density of the waste toner becomes smaller while the waste toner is moved from the intermediate transfer belt 53 via the fur brush roller 62 and the metal roller 63, as described above. This also suppresses scattering of waste toner during movement of the waste toner.

The housing 64 includes the upper opening 641, flange portions 642 and 643, and a waste toner conveying portion 644. The housing 64 stores the waste toner collected by the metal roller 63. The seal 66 is fixed to the flange portion 642 that extends outward. The blade 65 is fixed to the flange portion 643 that extends outward. The waste toner conveying portion 644 has a recessed shape and is formed such that opposite ends thereof continue to the flange portions 642 and 643, respectively. This also forms the upper opening 641. The upper opening 641 receives the waste toner collected by the metal roller 63. A discharge port (not shown) through which the waste toner is discharged from the housing 64, is formed in a bottom surface of the waste toner conveying portion 644 at a rear end side thereof.

The blade 65 is configured to scrape off the waste toner from the surface of the metal roller 63 while the metal roller 63 is rotating. The blade 65 is, as a whole, formed from an elastic material such as urethane, and is fixed to the flange portion 643 of the housing 64 via a support member 68. In addition, the blade 65 extends from the housing 64 rightward in an approximately horizontal direction toward the metal roller 63. A tip portion of the blade 65 is in contact with the metal roller 63. A portion of the blade 65 that is in contact with the metal roller 63 is positioned lower than the shaft center A2 of the rotation shaft 631 of the metal roller 63 and directly above the screw 67. With this configuration, the waste toner scraped off from the metal roller 63 by the blade 65 drops toward the screw 67 effectively. In addition, in the above-described case where the fur brush roller 62 is higher in peripheral speed than the intermediate transfer belt 53, and the metal roller 63 is higher in peripheral speed than the fur brush roller 62, the distribution density of the waste toner becomes smaller as described above during a process where the waste toner removed from the intermediate transfer belt 53 is conveyed via the fur brush roller 62 and the metal roller 63. This also makes it possible for the blade 65 to scrape off the waste toner from the metal roller 63 effectively.

The seal 66 is configured to seal a gap between the metal roller 63 and the housing 64 at the upper opening 641 of the housing 64. The seal 66 is, as a whole, formed from an elastic material such as urethane, and is elastic. In addition, the seal 66 is fixed to the flange portion 642 of the housing 64. The seal 66 projects from the flange portion 642 of the housing 64 in an approximately horizontal direction toward the metal roller 63, and a tip portion thereof is in contact with the metal roller 63. Here, the "approximately horizontal direction" means a direction which includes the horizontal direction and in which an absolute value of an intersection angle with respect to the horizontal direction is equal to or smaller than 15 degrees. In addition, the case where a member projects in an approximately horizontal direction includes a case where the member projects in the horizontal direction as a whole excluding a part thereof, such as a case where a tip portion of the seal 66 that projects in the horizontal direction as a whole, is curved or bent. As described above, the metal roller 63 rotates in an opposite direction to the fur brush roller 62 when a rotational driving force is input to the rotation shaft 631. That is, when the metal roller 63 rotates, a downward force acts on a part of the seal 66 (the tip portion of the seal 66) that comes into contact with the metal roller 63. At this time, an elastic restoring force of the seal 66 acts on the metal roller 63. This enhances the adhesive property between the seal 66 and the metal roller 63, making it possible to suppress the waste toner from backflowing from the housing 64.

The screw 67 is disposed within the housing 64 so as to convey the waste toner stored in the housing 64. The screw 67 includes a rotation shaft 671, and rotates in the same direction (clockwise in FIG. 2) as the metal roller 63 when a rotational driving force is input to the rotation shaft 671 around which a paddle of a spiral shape is formed. With this configuration, the waste toner is conveyed toward the discharge port. A shaft center A4 of the rotation shaft 671 of the screw 67 is positioned lower than the shaft center A2 of the rotation shaft 631 of the metal roller 63. That is, the screw 67 is positioned relatively lower than the metal roller 63.

A waste toner storage portion 70 is provided below the housing 64. When waste toner is discharged from the discharge port, the waste toner is guided into and collected in a waste toner bottle 71 included in the waste toner storage portion 70. That is, the residual toner on the surface of the intermediate transfer belt 53 is collected by the belt cleaning device 6 and stored in the waste toner bottle 71 as waste toner.

Meanwhile, a housing of a cleaning device may be disposed at a side of a removal roller such as a fur brush roller. In that case, a seal is arranged to stand upright facing a removal roller. However, in a case where an opening portion of the housing is opened to a side, a lower end portion of the seal is fixed, and an upper end portion is arranged to stand so as to be in contact with a collection roller such as a metal roller. With this configuration, when waste toner stays at the fixed portion of the seal, the pressure in the housing rises, and a force toward the removal roller side acts on the upper end portion of the seal that is a free end. As a result, when a predetermined force acts on the upper end portion of the seal, a gap is made between the upper end portion of the seal and the collection roller, and waste toner may backflow to the removal roller through the gap.

On the other hand, according to the image forming apparatus 10 of the present embodiment, the seal 66 comes into contact with the metal roller 63, and a gap formed between the metal roller 63 and the housing 64 at the upper opening 641 of the housing 64, is closed by the seal 66. In connection with this, a fixed portion of the seal 66 is positioned higher than a bottom portion of the housing 64. Accordingly, waste toner is suppressed from staying at the fixed portion. This makes it possible to suppress the pressure within the housing from rising, and suppress a force toward the fur brush roller 62 from acting on the tip portion of the seal 66. As a result, it is possible to suppress a gap from being made between the metal roller 63 and the tip portion of the seal 66, and suppress waste toner from backflowing from the housing 64 toward the fur brush roller 62.

In addition, since the seal 66 projects in the approximate horizontal direction from the flange portion 642 of the housing 64 toward the metal roller 63, it is possible to effectively suppress the waste toner from staying at the fixed portion. Furthermore, since a rotation of the metal roller 63 causes a downward force to act on a portion (the tip portion) of the seal 66 that is in contact with the metal roller 63, it is possible to effectively suppress a force toward the fur brush roller 62 from acting on the tip portion of the seal 66. This also effectively suppresses the waste toner from backflowing from the housing 64.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
an image carrier configured to carry a toner image;
an intermediate transfer belt to which the toner image is transferred from the image carrier;
a removal roller configured to rotate while in contact with the intermediate transfer belt and remove residual toner from the intermediate transfer belt;
a collection roller configured to rotate while in contact with the removal roller so as to collect, from the removal roller by electrostatic force, waste toner that is the residual toner removed by the removal roller;
a housing having an upper opening for receiving the waste toner collected by the collection roller and configured to store the waste toner;
a screw configured to convey the waste toner stored in the housing; and
a seal configured to come into contact with the collection roller and close a gap between the collection roller and the housing at the upper opening, wherein
the seal projects in an approximately horizontal direction toward the collection roller from a portion of the housing to which the seal is fixed, and a tip portion of the seal is in contact with the collection roller.

2. The image forming apparatus according to claim 1, wherein
a part of the collection roller is positioned lower than the upper opening.

3. The image forming apparatus according to claim 2, wherein
the collection roller rotates in a direction for causing a downward force to act on a part of the seal that comes into contact with the collection roller.

4. The image forming apparatus according to claim 1, further comprising:
a support roller rotatably supporting the intermediate transfer belt, wherein
the removal roller is in contact with the intermediate transfer belt in a state where the removal roller faces the support roller via the intermediate transfer belt, and
a shaft center of a rotation shaft of the collection roller is positioned lower than a shaft center of a rotation shaft of the removal roller.

5. The image forming apparatus according to claim 4, wherein
a distance between a first vertical line and a second vertical line is larger than a distance between the first vertical line and a third vertical line, wherein the first vertical line passes through a shaft center of a rotation shaft of the support roller, the second vertical line passes through the shaft center of the rotation shaft of the collection roller, and the third vertical line passes through the shaft center of the rotation shaft of the removal roller.

6. The image forming apparatus according to claim 1, wherein
a shaft center of a rotation shaft of the screw is positioned lower than a shaft center of a rotation shaft of the collection roller.

7. The image forming apparatus according to claim 1, further comprising:
a blade configured to scrape off the waste toner from the collection roller, wherein
a portion of the blade that is in contact with the collection roller is positioned lower than a shaft center of a rotation shaft of the collection roller and directly above the screw.

8. The image forming apparatus according to claim 1, wherein
the removal roller is higher in peripheral speed than the intermediate transfer belt, and
the collection roller is higher in peripheral speed than the removal roller.

9. The image forming apparatus according to claim 1, further comprising:
a pre-brush configured to preliminarily charge toner that has remained on the intermediate transfer belt.

\* \* \* \* \*